United States Patent [19]

Alderman

[11] Patent Number: 5,653,481

[45] Date of Patent: Aug. 5, 1997

[54] PIPE CLAMP WITH LIVE LOADING NUT ASSEMBLY

[75] Inventor: Darold S. Alderman, Delevan, Wis.

[73] Assignee: United Dominion Industries, Inc., Charlotte, N.C.

[21] Appl. No.: 599,619

[22] Filed: Feb. 9, 1996

[51] Int. Cl.⁶ .................................................. F16L 23/08
[52] U.S. Cl. .................. 285/363; 285/367; 285/411; 411/432; 411/533; 24/279; 24/285
[58] Field of Search .................................. 285/366, 367, 285/406, 410, 364, 411, 363; 24/279, 285; 411/149, 150, 432, 533

[56] References Cited

U.S. PATENT DOCUMENTS

| | | | |
|---|---|---|---|
| 1,472,405 | 10/1923 | Amberton | 285/406 X |
| 2,430,884 | 11/1947 | Noyes | 411/261 X |
| 4,198,076 | 4/1980 | Mezei | 285/364 X |
| 4,312,524 | 1/1982 | Allread | 285/137.1 X |
| 4,714,229 | 12/1987 | Force et al. | 24/279 X |
| 5,393,183 | 2/1995 | Hinton | 411/533 X |
| 5,522,625 | 6/1996 | Flick et al. | 24/279 X |

FOREIGN PATENT DOCUMENTS

| | | | |
|---|---|---|---|
| 894650 | 3/1944 | France | 411/149 |
| 1167899 | 12/1958 | France | 411/150 |
| 1266578 | 6/1961 | France | 24/285 |

Primary Examiner—Terry Lee Melius
Assistant Examiner—Heather Shackelford
Attorney, Agent, or Firm—Fitch, Even, Tabin & Flannery

[57] ABSTRACT

A clamp with a live loading clamp nut assembly is provided for pipe joints and the like. The nut assembly includes a body member movable within a cage. A plurality of springs, such as spring washers, are employed in the cage to provide a stored spring energy to maintain the clamping pressure in a desired range. The clamping arrangement preferably includes a pair of jaws, hinged together at one end so that the other ends of the jaws are moved toward and away from one another. The nut assembly presses the free ends of the jaws together to maintain a desired tightness in the pipe joint.

6 Claims, 3 Drawing Sheets

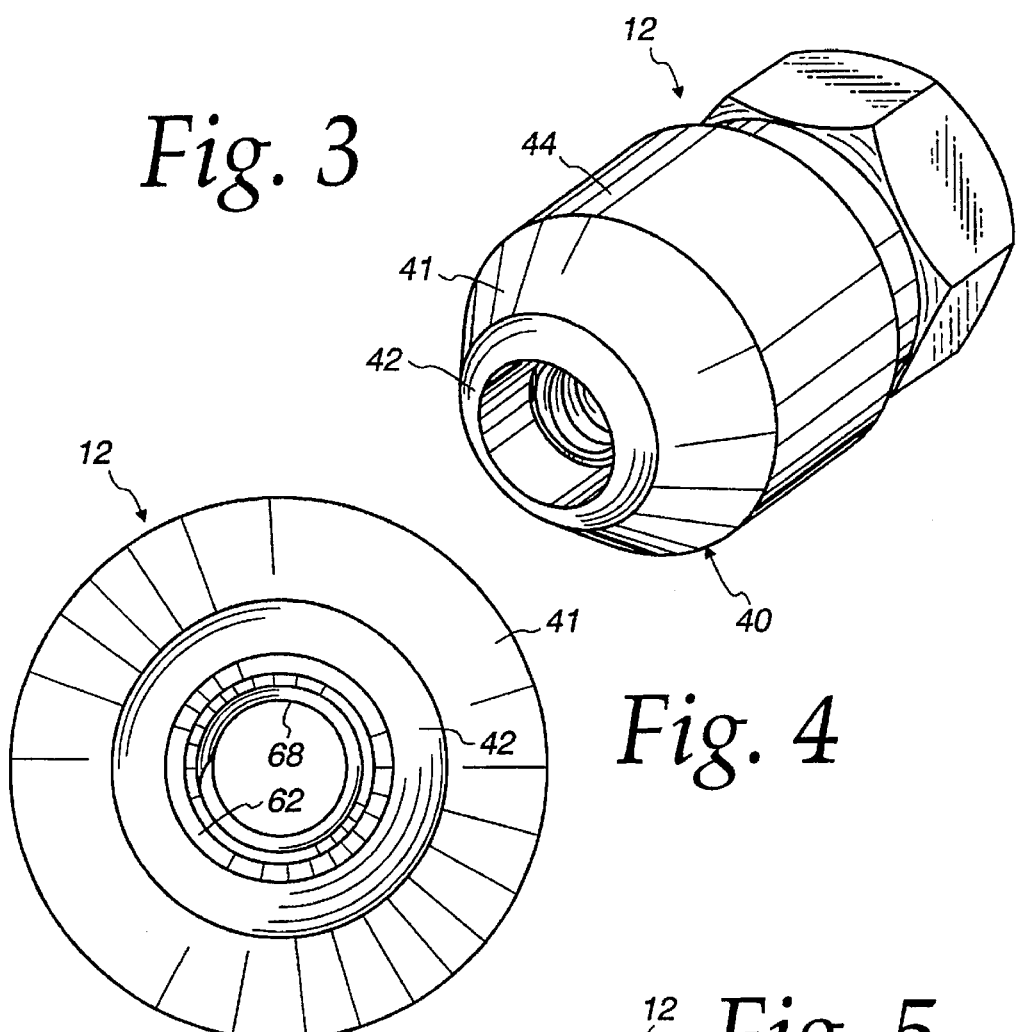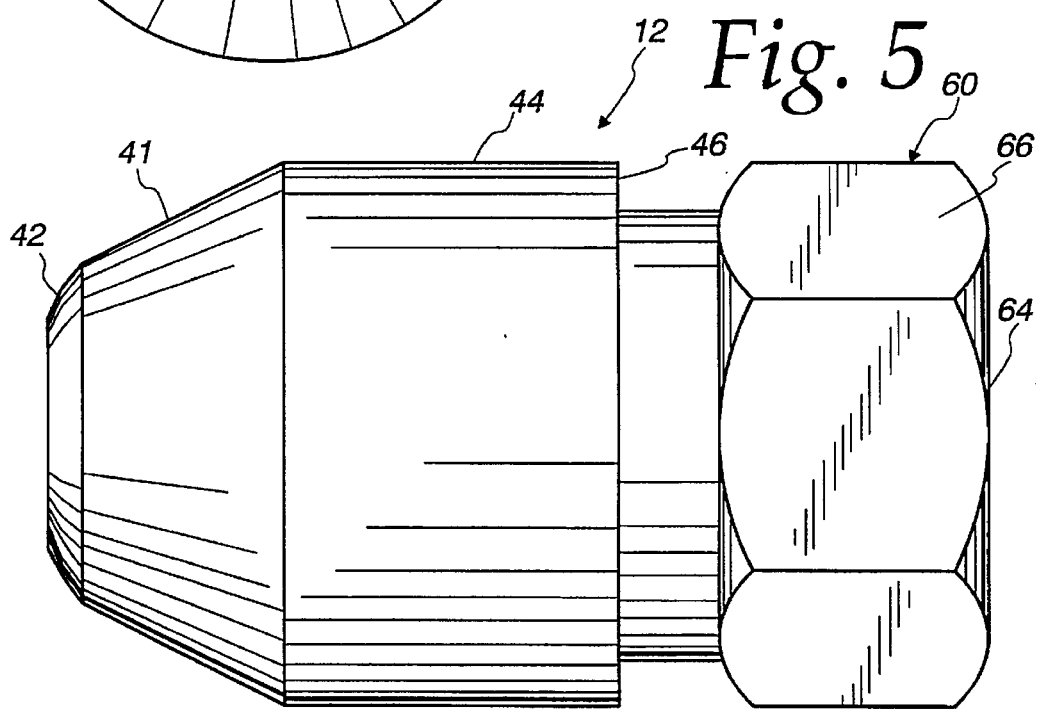

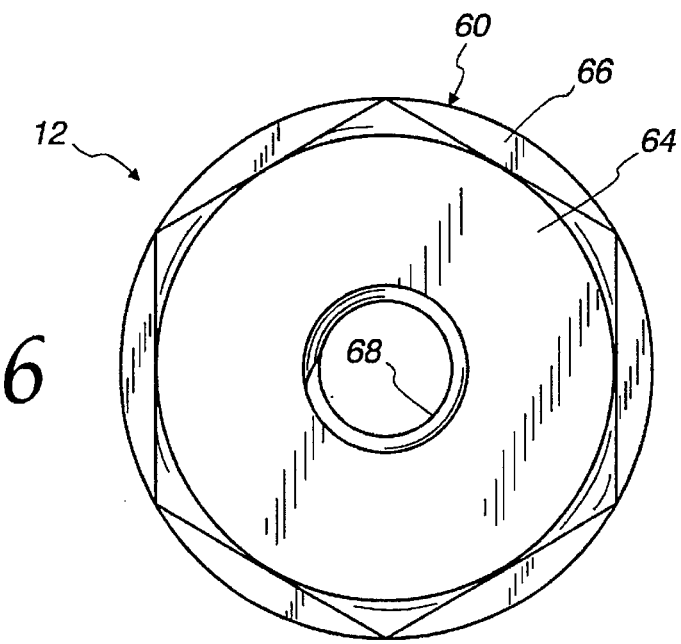
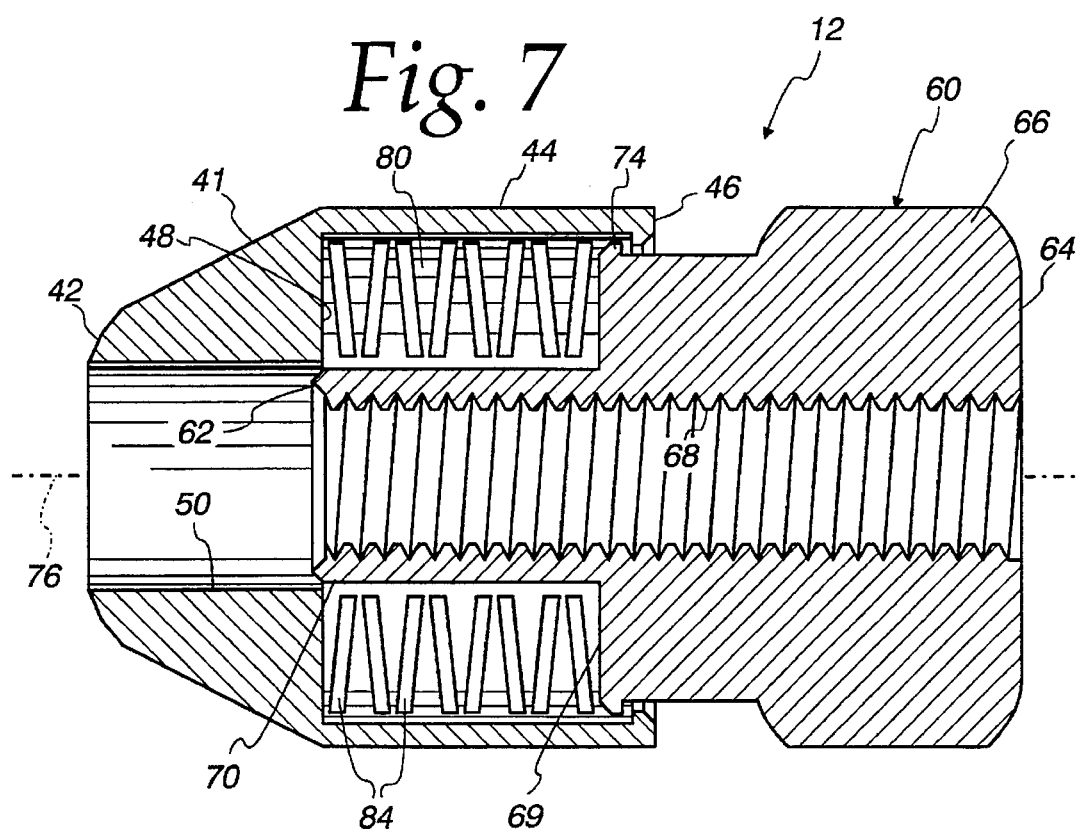

PIPE CLAMP WITH LIVE LOADING NUT ASSEMBLY

BACKGROUND OF THE INVENTION

1. Field of the Invention

The present invention pertains to pipe clamp assemblies, and in particular to pipe clamp assemblies having a live loading feature for maintaining desired clamping pressures.

2. Description of the Related Art

Pipe clamp assemblies are well known for joining one pipe to another pipe, to a fixture or a hose, for example. These types of clamps usually rely on threaded fasteners to maintain clamping pressure. Examples are found in U.S. Pat. Nos. 4,488,743; 4,871,181; 5,456,447; 1,317,963; 3,938,832; and 5,024,453.

However, in some applications the pipe joint is routinely taken apart or "broken-down" for cleaning or periodic maintenance. In the food industry, for example, where clean in place practices are not followed, piping systems are taken apart for periodic cleaning of their interior surfaces to maintain sanitary conditions. If pipes of this type are connected with the above-described conventional fasteners having bolts and nut components employed to apply pressure to pipe flanges, time and labor needed for periodic cleaning is increased.

Accordingly, a number of so-called "quick-acting" pipe clamp assemblies have been proposed to address this need. Examples are given in U.S. Pat. Nos. 1,093,868; 3,181,901; 3,966,240; and 2,449,795. These quick-acting clamp assemblies typically include a clamping collar formed in two parts which are hinged together, and which have fastening flanges opposite the hinge. A threaded fastener, which is typically permanently mounted to one flange with a pivot connection swings adjacent the other flange, and a threaded knot is advanced along the bolt to engage the opposite flange, drawing the flanges together and hence tightening the joint. The same concept has been applied to a band clamp or so-called "hose clamp", as described in U.S. Pat. No. 5,329,673. This arrangement also includes spring bias means for maintaining clamping pressure. An example of another hose clamp with spring bias means is given in U.S. Pat. No. 4,819,307. Use of spring bias means for maintaining clamping assembly is indicated where a piping system subject to significant vibrations or materials in the pipe joint may undergo a change such that the clamping pressure might lessen. Accordingly, spring pressure is relied upon to adjust the clamp, such that desired clamping pressure on the joint is maintained despite such changes. U.S. Pat. No. 4,429,847 shows a rigid pipe clamp with threaded fasteners, and employing spring washers. However, the clamp assembly is not of the quick-acting type and a need still exists for a quick-acting clamp assembly with improved live loading characteristics.

It is an object of the present invention to provide a clamping assembly of the quick-acting type.

Another object of the present invention is to provide a clamping assembly of the above-described type where clamping pressure is provided by a threaded fastener with a nut movable along a pivotally mounted bolt.

A further object of this invention is to provide a clamping assembly of the above-described type where a resilient bias means is employed to augment the clamping pressure when necessary.

Another object of the present invention is to provide a clamping assembly in which the spring bias means is located within a nut assembly so as to be automatically deployed when a pipe joint is first assembled.

This and other objects of the present invention are provided in a live loading clamp nut assembly, comprising:

a body having first and second opposed ends and defining an internally threaded bore for receiving a threaded bolt extending along a predefined axis;

a cage having first and second opposed ends, for receiving the body and dimensioned so that the body is free to move along the axis; and spring bias means within the cage between the cage first end and the body first end for urging the body toward the second end of the cage.

Further objects of the present invention are provided in a live loading clamp nut assembly, comprising:

a nut member having first and second opposed ends and extending along a predefined axis, the nut member including a body with a stepped end wall, a central part having a free end adjacent the nut member first end, and extending from the end wall with the free end projecting beyond the end wall, and the nut member further defining a central passageway extending along the axis from the second end of the nut member to the free end of the central part;

a spring cage having first and second opposed ends, an outer shell extending along the axis, between the first and the second ends, an inner sleeve within the outer shell, extending from the spring cage first end toward the spring cage second end and cooperating with the outer shell to form an internal cavity;

resilient bias means in the internal cavity of the spring cage; and the forward end wall of the nut member received in the internal cavity of the spring cage.

Further objects of the present invention are provided in a live loading clamping assembly, comprising:

first and second pairs, each having first and second ends, hinged together at the first ends and having outwardly projecting shoulders at the second ends;

a bolt pinned at one end to the first shoulder so as to be swingable adjacent the second shoulder;

a nut assembly for threadingly engaging the bolt so as to engage the second shoulder to draw the first and the second pairs together, the nut assembly comprising:

a nut member having first and second opposed ends and extending along a predefined axis, the nut member including a body with a stepped end wall, a central part having a free end adjacent the nut member first end, and extending from the end wall with the free end projecting beyond the end wall, and the nut member further defining a central passageway extending along the axis from the second end of the nut member to the free end of the central part;

a spring cage having first and second opposed ends, an outer shell extending along the axis, between the first and the second ends, an inner sleeve within the outer shell, extending from the spring cage first end toward the spring cage second end and cooperating with the outer shell to form an internal cavity;

resilient bias means in the internal cavity of the spring cage; and the forward end wall of the nut member received in the internal cavity of the spring cage.

BRIEF DESCRIPTION OF THE DRAWINGS

FIG 3 is a perspective view of a live load and clamp nut assembly;

FIG. 4 is a front elevational view thereof;

FIG. 5 is an end elevational view thereof;

FIG. 6 is another end elevational view thereof; and

FIG. 7 is a cross-sectional view taken along the line 7—7 of FIG. 6.

DETAILED DESCRIPTION OF PREFERRED EMBODIMENTS

Figure 1:
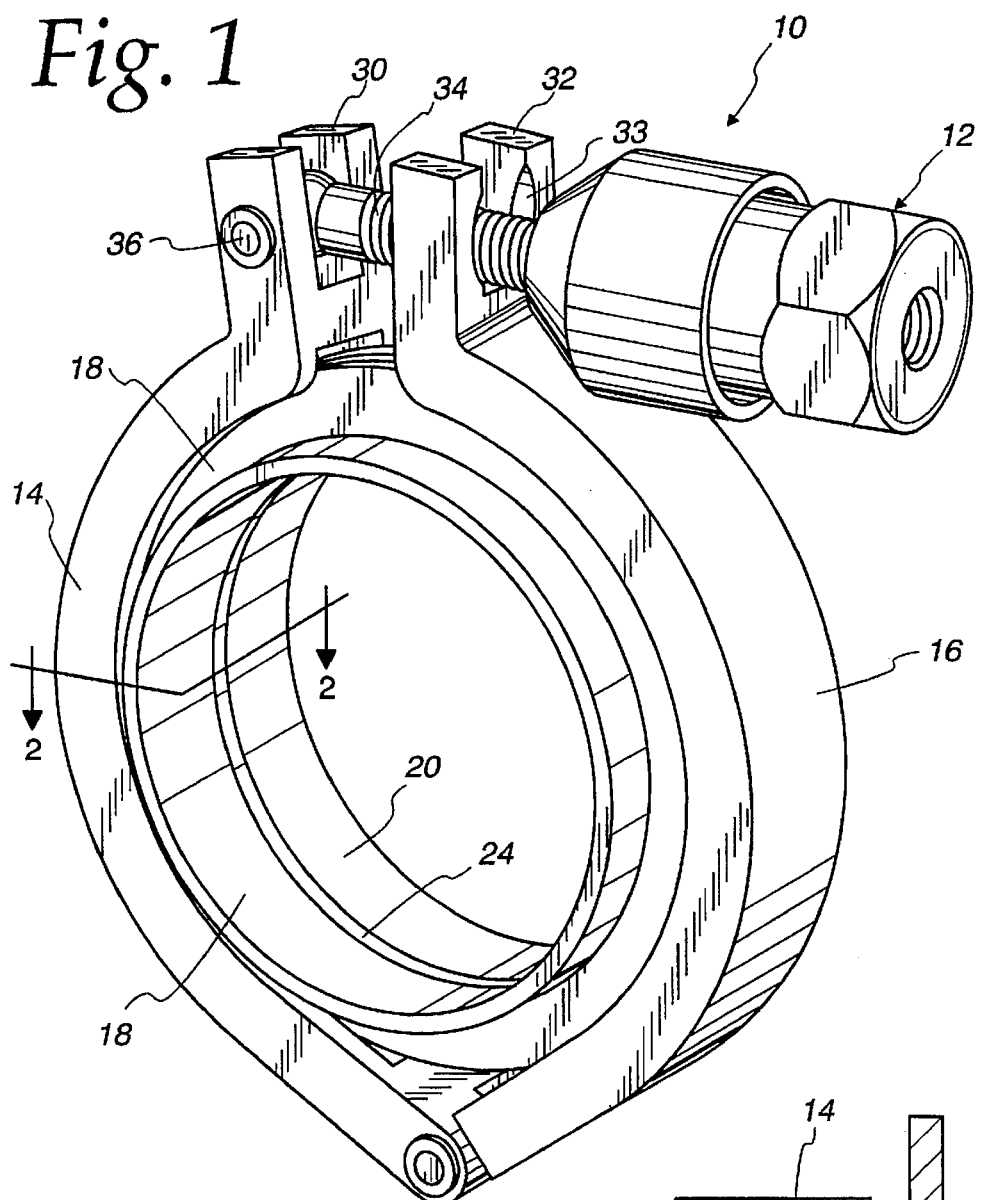
FIG. 1 is a perspective view of a pipe clamp assembly.

Referring now to the drawings, and initially to FIG. 1, a clamping assembly is generally indicated at 10. The clamping assembly 10 includes a live loading clamp nut assembly generally indicated at 12. Except for the nut assembly 12, clamping assembly 10 is generally the same as that commercially available from the assignee of the present invention as Model No. 13MHHM Heavy Duty Clamp Assembly. In place of the nut assembly 12, the commercially available clamping assembly referenced herein includes a wing nut (not shown) having an internally threaded bore, functionally resembling the wing nut of U.S. Pat. No. 3,966,240.

Figure 2:
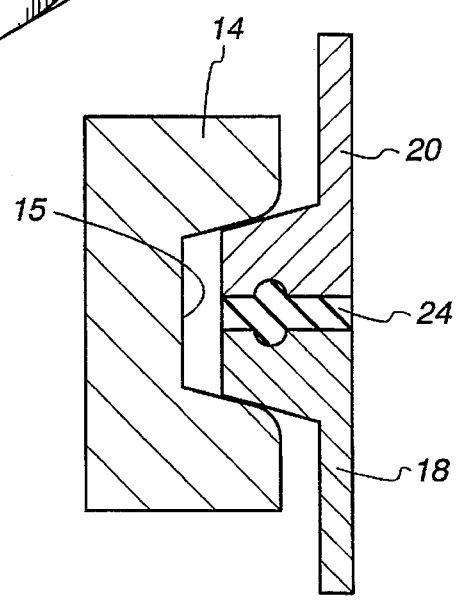
FIG. 2 is a cross-sectional view taken along the line 2—2 of FIG. 1.

The clamping assembly 10 includes first and second hinged jaws 14, 16, a pair of opposed flanges 18, 20 and a gasket 24 preferably made of PTFE material. As will be seen in the cross-sectional view of FIG. 2, the jaws have a generally U-shaped cross-section, forming a groove 15 for receiving the outer periphery of the flanges therein. As indicated in FIGS. 1 and 2, the flanges 18, 20 do not entirely enclose the gasket 24 and, depending upon the relative proportion of the gasket and flanges, the gasket peripheral edge could extend to the outer surface of the flanges or slightly therebeyond, if desired.

Referring again to FIG. 1, the jaws 14, 16 include shoulders 30, 32, each of which are preferably split in a known manner so as to receive an eye bolt 34 therebetween. Eye bolt 34 is pinned at 36 to shoulder 30 so as to be swingably received between the split parts of shoulder 32. Flange 32 preferably includes a small concave recess in its outer surface, where the flange is engaged by the nut assembly 12.

Referring now to FIGS. 3–7, the nut assembly 12 is seen to include a cage 40 having a tapered nose 41 with a rounded free end 42 and a collar portion 44 with an inwardly turned free end 46 (see FIG. 7). Cage 40 includes an internal stop wall 48 and a central passageway 50 extending between the free end 42 and stop wall 48.

Referring again to FIG. 7, nut assembly 12 further includes a body member generally indicated at 60, having a first end 62 and a second end 64 formed by an enlarged head 66 having flats so as to resemble a machine nut. Body 60 includes an internal wall 68 from which a generally cylindrical central part 70 extends. Central part 70 is terminated at the free end 62 as can be seen in FIG. 7. The forward or free end 62 of central part 70 is received in internal passageway 50 of cage 40 and preferably is maintained in alignment with the passageway by a stepped shoulder 74 which engages the inwardly turned end 46 of cage 40 to hold the body member 60 captive within cage 40. As can be seen in FIG. 7, internal wall 68 of body member 60 is spaced from internal stop wall 48 of cage 40 and, accordingly, body member 60 is free to travel within cage 40, back and forth along central axis 76.

Referring again to FIG. 7, a spring-receiving cavity 80 is formed between walls 48, 68, the outer surface of central part 70 and the band portion 44 of cage 40. Spring bias means are located in cavity 80 to urge internal wall 68 of body member 60 away from internal stop wall 48 of cage 40. The spring bias means may comprise virtually any type of commercially available springs, such as coil springs, and a stack of wave washers and flat washers, for example. However, the spring means preferably comprises a stack of paired spring washers 84 which ride on central part 70. The spring washers are commonly referred to as "Belleville" or "Bellville" washers.

Central part 70 preferably comprises a hollow cylinder, with an internally threaded bore wall. In a preferred embodiment, the bore wall previously designated by the reference numeral 68 extends through the entire length of body member 60, between free ends 62, 64. If desired, the internally threaded bore wall 68 can be shortened, so as to extend only within a portion of central part 70.

When fitted to the clamping assembly 10, nut assembly 12 is threadedly engaged with eye bolt 34, with threads of the eye bolt engaging the internally bore wall 68. As the nut assembly 12 is advanced, the rounded free end 42 engages flange 32. Further application of a tightening torque to the enlarged head 66 causes internal wall 68 of body member 60 to be drawn toward the internal stop wall 48 of cage 40, taking up any slack or spacing in the stack of washers 84. Further torque applied to the enlarged head 66 causes the spring washers 84 to be compressed, thus storing spring force within nut assembly 12.

It is preferred that a predefined torque be applied to enlarged head 66, causing a partial compression or deformation of the spring washers 84. However, it is also contemplated that a further tightening torque will be applied to the enlarged head 66, causing the spring washers 84 to "bottom out". In either event, the shoulders 30, 32 will be drawn together, drawing the pipe flanges 18, 20 together, compressing gasket 24 therebetween. Over time, if the pipe joint should undergo a loosening, the stored spring energy will automatically be applied to force the shoulders 30, 32 together, maintaining a desired clamping pressure. If the stack of spring washers 84 has been "over tightened" so as to "bottom out" the initial portion of the clamping joints, loosening will be taken up within the nut assembly, to allow the spring washers 84 to open up, thus restoring them to a predefined force.

In summary, when adjustment is necessary to maintain a clamping force and the spacing between shoulders 30, 32 would otherwise increase slightly, the energy stored in springs 34 pushes cage 40 away from body member 60, body member 60 being held in place with respect to shoulder 30 by threaded engagement with eye bolt 34. Thus, shoulder 32 is forced in a direction toward shoulder 30 and thus clamping force is maintained through application of the energy stored in springs 84. With the clamping arrangement shown in FIG. 1, the pipe joint is maintained in a leak-type condition, despite a change in the resiliency of the gasket 24. This arrangement has been proven to be especially effective for pipe joints employing gaskets 24 made of PTFE and the like material having a reduced resiliency, compared to other types of conventional gasket materials.

It is especially important for PTFE and other less resilient gasket materials, that the pipe joint remain liquid-tight when the resiliency of the gaskets (if any) can no longer be relied upon to maintain the liquid-type condition. In the preferred embodiment, the washers 84 are substantially identical, and the spring force is adjusted from one application to another by varying the strength of spring washers employed. If a larger number of spring washers is required, the band portion 44 of cage 40 can be increased to accommodate an increased stack length of the spring washers. Alternatively, spring washers of different spring materials and different thicknesses can be employed to vary the spring force. As mentioned, spring washers are most preferred for providing spring force. The present invention is, however, also advantageous when used with elastomer gaskets.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A live loading clamp nut assembly, comprising:

a body having first and second opposed ends, with a body stop wall intermediate the first and second ends and a sleeve portion which extends to the first end and which defines an internally threaded bore for receiving a threaded bolt extending along a predefined axis;

a cage held captive on the body, the cage having first and second opposed ends said first end receiving the body, including a cage stop wall intermediate the first and second end of the cage with an internal bore wall which extends between the cage stop wall and the second end of the cage which is dimensioned to slidingly receive portions of the sleeve portion so that the body is free to move along the axis, the cage defining a cage internal cavity extending between the cage stop wall and a point adjacent the first end of the cage; and spring bias means comprising a plurality of spring washers stacked on the sleeve portion within the cage internal cavity, between the cage stop wall and the body stop wall for urging the cage stop wall and the body stop wall away from each other.

2. The assembly of claim 1 wherein the cage includes an inwardly turned lip at its first end and the body includes a shoulder portion adjacent its first end with an outwardly turned lip interfering with the inwardly turned lip on the cage to hold the cage captive on the body.

3. The assembly of claim 1 wherein the second end of the cage has a rounded outer surface.

4. A live loading clamping assembly, including first and second clamp members, each clamp member having first and second ends, the clamp members hinged together at the first ends and having respective outwardly projecting shoulders at the second ends, a bolt pinned at one end to the first shoulder so as to be swingable adjacent the second shoulder, a nut assembly for threadingly engaging the bolt so as to engage the second shoulder to draw the first and the second clamp members together, the nut assembly comprising:

a body having first and second opposed ends, with a body stop wall intermediate the first and second ends and a sleeve portion which extends to the first end and which defines an internally threaded bore for receiving the bolt, extending along a predefined axis;

a cage held captive on the body, the cage having first and second opposed ends said first end receiving the body, including a cage stop wall intermediate the first and second end of the cage with an internal bore wall which extends between the cage stop wall and the second end of the cage which is dimensioned to slidingly receive portions of the sleeve portion so that the body is free to move along the axis, the cage defining a cage internal cavity extending between the cage stop wall and a point adjacent the first end of the cage; and spring bias means comprising a plurality of spring washers stacked on the sleeve portion within the cage internal cavity between the cage stop wall and the body stop wall for urging the cage stop wall and the body stop wall away from each other to resiliently hold the first ends of the clamp members so as to prevent their being spread apart.

5. The assembly of claim 4 wherein the cage includes an inwardly turned lip at its first end and the body includes a shoulder portion adjacent its first end with an outwardly turned lip interfering with the inwardly turned lip on the cage to hold the cage captive on the body.

6. The assembly of claim 4 wherein the second end of the cage has a rounded outer surface.

* * * * *